United States Patent [19]

Sullivan et al.

[11] 4,290,547

[45] Sep. 22, 1981

[54] RECLOSABLE ENVELOPE AND METHOD OF MANUFACTURE

[75] Inventors: John Sullivan, San Jose; Harold R. Lillibridge, Burlingame, both of Calif.

[73] Assignee: Champion International Corporation, Stamford, Conn.

[21] Appl. No.: 129,556

[22] Filed: Mar. 12, 1980

[51] Int. Cl.³ .......................... B65D 27/12; B42F 1/00
[52] U.S. Cl. ..................................... 229/77; 24/208 A
[58] Field of Search ..................... 229/77, 78 A, 78 R, 229/45 R, 46; 150/7; 24/208 A

[56] References Cited

U.S. PATENT DOCUMENTS 2,283,815  5/1942  Levine ............................. 229/78 A
3,023,472  3/1962  Ranseen ........................... 229/77 X
3,561,074  8/1968  Mosher, Jr. et al. ............. 24/208 A Primary Examiner—George T. Hall
Attorney, Agent, or Firm—Evelyn M. Sommer

[57] ABSTRACT

An envelope is provided with a first and second button having a depending portion inserted through an opening in a flap and an adjacent body portion, respectively, which is then flattened by the application of ultrasonic energy to vibrate each button and its depending portion against an anvil, rendering each button captive on the envelope. A string is inserted through a slot or hole in the depending portion of one of the buttons and fused to the button as the depending portion is flattened. The string is used to releasably connect the buttons and thus, the envelope flap to the adjacent body portion.

14 Claims, 12 Drawing Figures

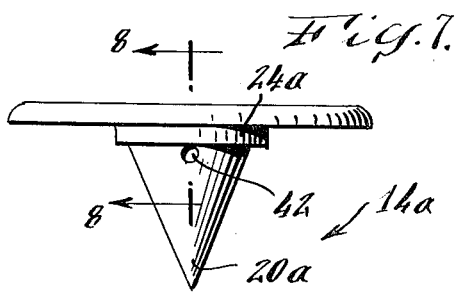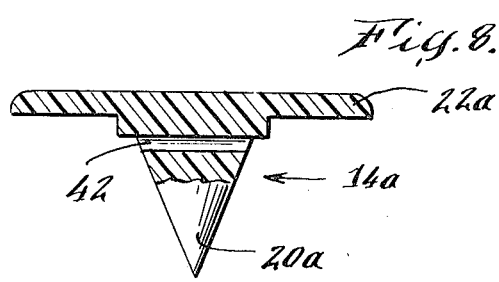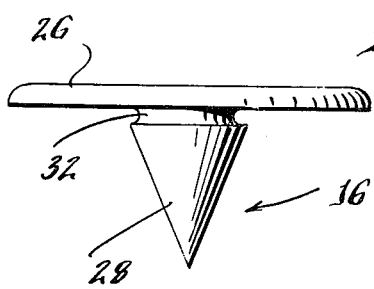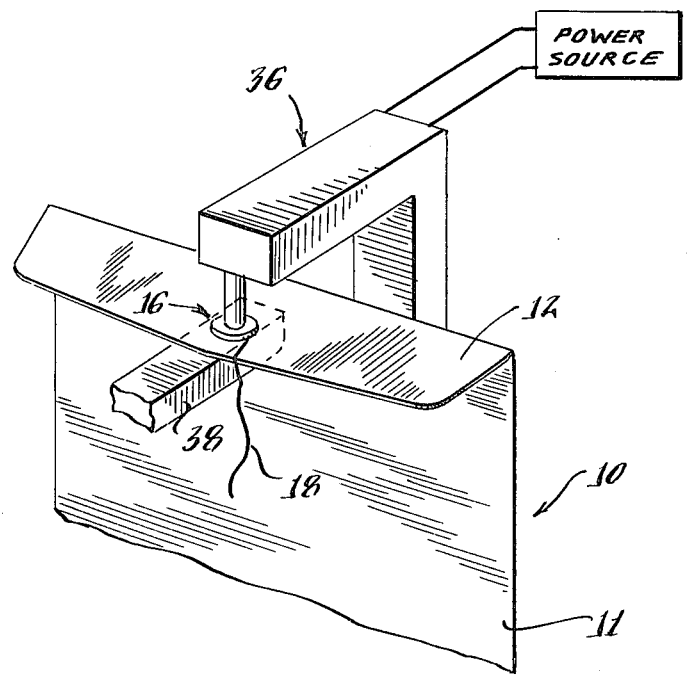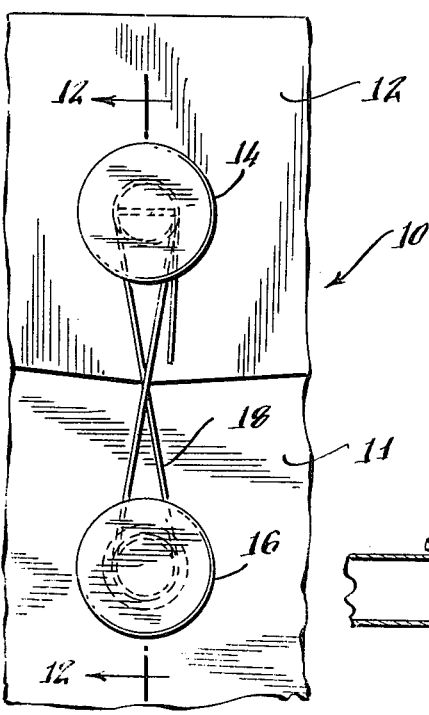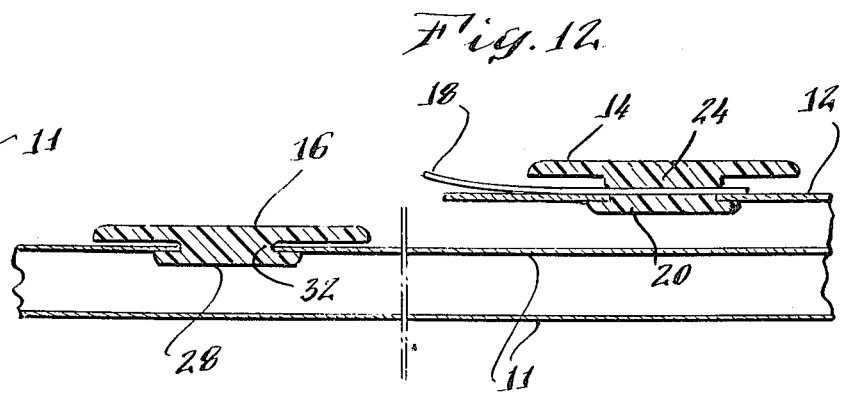

RECLOSABLE ENVELOPE AND METHOD OF MANUFACTURE

BACKGROUND OF THE INVENTION

1. Field of the Invention

This invention relates to a reclosable envelope, and more particularly, a reclosable envelope as used in inter-office communications and the method of manufacturing the same.

2. Description of the Prior Art

Conventional inter-office envelopes are designed to be of sturdy construction in order to withstand multiple reuses thereof, as the envelope is often employed for the shipment of inter-office communications within a large organization. Typically, an envelope of this prior art type is formed of relatively high-grade paper, and includes a reclosable flap mechanism, usually consisting of a string secured to a tab affixed to the flap of the envelope and capable of being wound about a second tab fixed to one surface of the body of the envelope. However, this prior art type of envelope requires riveting of each tab to their respective parts of the envelope. This results in a time consuming and expensive manufacturing process, which includes many manual steps.

Applicant is also aware of a prior art device disclosed in U.S. patent application Ser. No. 808,601 filed on June 21, 1977, by Robert Cohn et al, entitled "Improved Inter-Office Envelope". This application specifically discloses the advantageous concept of connecting various tabs to an envelope via hot melt adhesive. This eliminates the requirement of riveting of such tabs and allows the tabs to be secured to the envelope by means of high-speed machines. In that application each of the tabs is substantially annular and are secured to their respective parts of the envelope by a single spot of adhesive. In another embodiment, the tab securable to the main body portion of the envelope is circular and is secured to the envelope by means of a plurality of spots of hot melt adhesive. However, the resultant bond will not be as strong as that derived through riveting of the tab, which may result in ultimate loss of the tab after repeated use and handling.

SUMMARY OF THE INVENTION

The present invention is an improvement over that of the prior art in the utilization of plastic buttons ultrasonically secured to the flap and body portion of a reclosable envelope. A string of meltable nylon or flexible non-plastic material is adhered to the button on the flap as it is secured so that the entire manufacturing operation is less time consuming and expensive than heretofore accomplished by the use of tabs riveted to the flap and body of the envelope and results in a superior fastening than tabs secured thereto utilizing a hot melt adhesive.

BRIEF DESCRIPTION OF THE DRAWINGS

Further objects and advantages of the invention will become apparent from the following description and claims, and from the accompanying drawings, wherein:

FIG. 7 is a side view in elevation of a third form of a button which can be secured to a flap of the reclosable envelope construction of the present invention;

FIG. 8 is a cross-sectional view of the button of FIG. 7 taken substantially along the plane indicated by line 8—8 of FIG. 7;

FIG. 9 is a side view in elevation of a button which can be secured to the body portion of the reclosable envelope construction of the present invention;

FIG. 10 is a perspective view illustrating the manner of securing the buttons of FIGS. 3 to 9, inclusive, to the reclosable envelope construction of the present invention;

FIG. 11 is a partial front view in elevation of the reclosable enevelope construction of the present invention; and FIG. 12 is a cross-sectional view taken substantially along the plane indicated by line 12—12 of FIG. 11.

DETAILED DESCRIPTION OF THE PREFERRED EMBODIMENT

Figure 1:
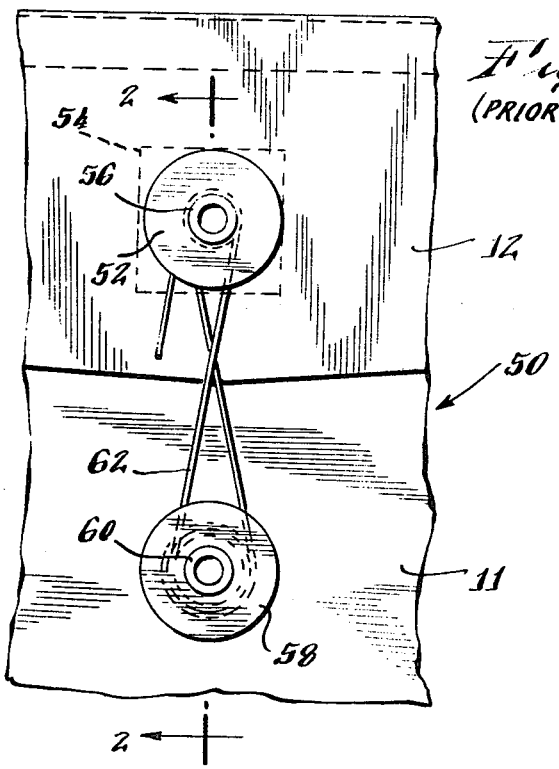
FIG. 1 is a partial front view in elevation of a prior art reclosable envelope construction.
Figure 2:
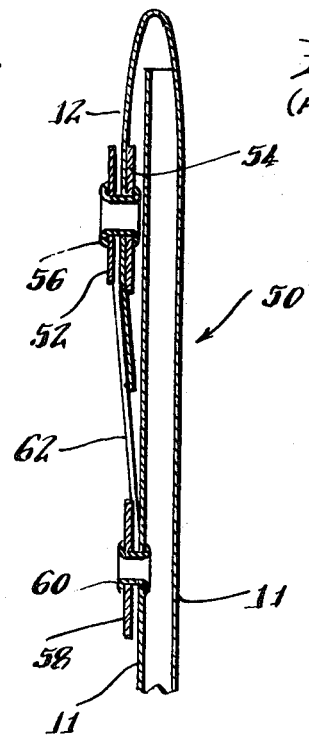
FIG. 2 is a cross-sectional view taken substantially along the plane indicated by line 2—2 of FIG. 1.

Referring now to the drawings in detail, wherein like numerals indicate like elements throughout the several views, FIGS. 1 and 2 illustrate a typical prior art reclosable envelope 50 which includes an enclosed body portion 11 hingedly connected to an overlying flap 12. A stiff, annular paper tab 52 and a backing, reinforcement tab 54 are affixed to flap 12 by a metal rivet 56. Similarly, a second, annular paper tab 58 is secured by a metal rivet 60 to body portion 11 of envelope 50. A string 62 is clamped between the tab 52 and flap 12 by rivet 56. String 62 can be wound about tab 58 to secure flap 12 to body portion 11 to close the envelope. The riveting of the tabs to the envelope is a time consuming and expensive manufacturing process.

The present invention comprises an envelope 10 including an enclosed body portion 11 hingedly connected to an overlying flap 12, a first button 14 secured to flap 12 and a second button 16 secured to body portion 11. Releasably inter-connecting the first and second buttons is an elongated flexible member, such as a string 18.

The flap 12 and body portion 11 of envelope 10 are conventional and are formed of paper or other suitable material including reinforced polymeric material. The overlying flap 12 is integrally formed with the enclosed body portion 11 of the envelope. The basic purpose of the invention is to provide an apparatus for releasably securing the flap 12 to the main body portion 11, which is as durable but simpler and less expensive than the riveted tabs 52 and 58 of envelope 50.

Figure 3:
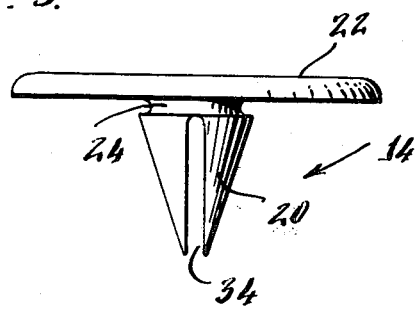
FIG. 3 is a side view in elevation of a first form of a button which can be secured to a flap of the reclosable envelope construction of the present invention.
Figure 5:
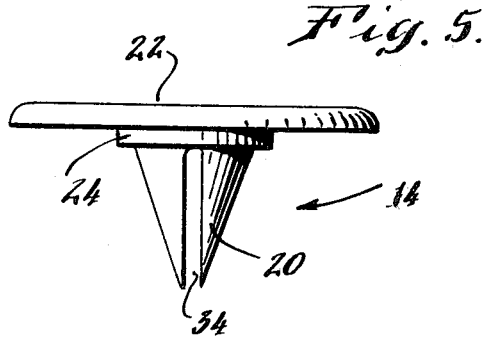
FIG. 5 is a side view in elevation of a second form of a button which can be secured to a flap of the reclosable envelope construction of the present invention.
Figure 4:
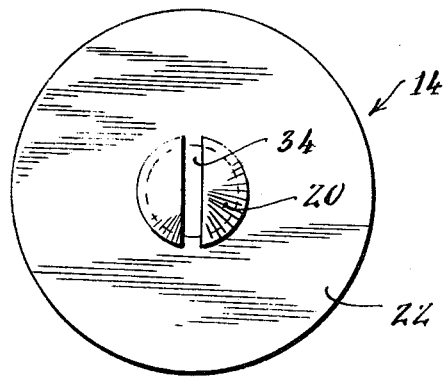
FIG. 4 is a bottom plan view of the bottom of FIG. 3.
Figure 6:
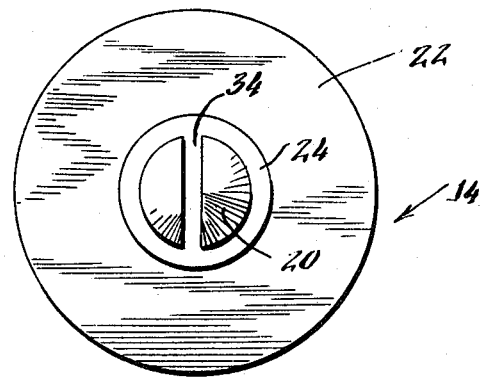
FIG. 6 is a bottom plan view of the button of FIG. 5.

The first button 14 is preferably formed of thermoplastic material and includes a conical portion 20 extending downwardly from a circular, planar base portion 22. Conical portion 20 is centrally located on the bottom surface of base 22 and is connected to the base by a cylindrical body portion 24, which may have a smaller diameter than the conical portion 20 (FIGS. 3 and 4) or a larger diameter (FIGS. 5 and 6). Conical member 20 includes a centrally located, elongated slot 34.

The second button 16 (FIG. 9) is also formed from a thermoplastic material and includes a circular base portion 26. A cone 28 depends from a cylindrical body member 32 secured to the center of the circular base 26. Body member 32 preferably has a smaller diameter than the base of cone 28.

The first and second buttons 14 and 16, respectively, are inserted through openings in the flap 12 and body portion 11 of envelope 10 during the formation of the envelope. Ultrasonic equipment 36 of the type manufactured by the Branson Sonic Power Company of Danbury, Conn., is used to vibrate and flatten the conical portions of the first and second buttons 14 and 16 against a suitable anvil 38 so that the first and second buttons are captively secured or "welded" to the paper of the flap 12 and body portion 11 of envelope 10 (see FIG. 12).

The string 18, formed from suitable thermoplastic, such as nylon or flexible non-plastic material, can be inserted in slot 34 of conical portion 20 of button 14 prior to the application of the ultrasonic welding equipment to the plastic material forming the button so that the string 18 and the plastic of the button 14 surrounding slot 34 are melted and fused together by the ultrasonic energy applied to securely adhere the string 18 to the button 14.

As shown in FIGS. 11 and 12 the string 18 is secured to the button 14 and can be wound about the smaller diameter cylindrical body portion 32 of button 16 to secure the flap 12 to body portion 11 of envelope 10 after a document has been inserted within the interior of the envelope.

As shown in FIGS. 7 and 8 in lieu of inserting the string 18 into the slot 34 of conical portion 20 of button 14, a hole 42 can be formed in a conical portion 20a of a button 14a to receive the string 18 therethrough. Upon the application of the ultrasonic energy to the button 14a, the button material will melt and fuse with the string 18 as described above.

What is claimed as new is:

1. A reclosable envelope comprising:
   an enclosed body portion hingedly connected to an overlying flap,
   a first button connected to the outer surface of said flap,
   a second button connected to the outer surface of said body portion, and
   means for releasably connecting said first and second buttons to thereby releasably secure said overlying flap and said body portion,
   said first and second buttons including
   a base portion and at least one integral depending portion extending downwardly from said base portion through an opening in said flap and said body portion, respectively, of said envelope, said depending portion being flattened towards said base portion so that said buttons are permanently connected to said envelope.

2. An envelope in accordance with claim 1 wherein said depending portion is conical in shape.

3. An envelope in accordance with claim 1 wherein said first button includes an elongated slot in its downwardly depending portion receiving said releasable interconnecting means therethrough.

4. An envelope in accordance with claim 1 wherein said first button includes an opening in its downwardly extending portion therethrough receiving said releasable interconnecting means therethrough.

5. An envelope in accordance with claim 1 wherein the integral depending portions of said first and second buttons are flattened by application of ultrasonic energy to said downwardly depending portion.

6. An envelope in accordance with claim 3 wherein said releasable interconnecting means includes a string.

7. An envelope in accordance with claim 6 wherein said first and second buttons and said releasable interconnecting means are formed from thermoplastic material.

8. An envelope in accordance with claim 4 wherein said releasable interconnecting means includes a string.

9. An envelope in accordance with claim 8 wherein said first and second buttons and said releasable interconnecting means are formed from thermoplastic material.

10. An envelope in accordance with claim 1 wherein said base portions are substantially circular in shape.

11. An envelope in accordance with claim 2 wherein the depending portion on said second button is connected to said base portion by a cylindrical body member having a smaller diameter than the base of the conical depending portion.

12. A method for manufacturing a reusable, reclosable envelope comprising the steps of:
    inserting a first and second button through an opening formed in a flap and an adjacent body portion, respectively, of an envelope in which the flap is to be releasably secured to said body portion,
    flattening an integral portion of said first and second buttons to cause said buttons to be retained on said flap and body portion, respectively, and
    inserting a string through one of said buttons prior to flattening the same so as to adhere said string to said button.

13. The method of claim 12 wherein said buttons are flattened by applying ultrasonic energy to each button held against a fixed surface causing said button to vibrate against said surface.

14. The method of claim 13 wherein said one button and string are formed from thermoplastic material and are fused together by the application of ultrasonic energy to vibrate said button.

* * * * *